United States Patent Office 3,222,303
Patented Dec. 7, 1965

3,222,303
TERTIARY AMINOPHENOL CATALYTIC
POLYURETHANE PRODUCTION
Horace Neil Hampson, Egham, Surrey, England, assignor to Shell Oil Company, New York, N.Y., a corporation of Delaware
No Drawing. Filed Sept. 6, 1962, Ser. No. 221,866
Claims priority, application Great Britain, Sept. 11, 1961, 32,521/61
10 Claims. (Cl. 260—2.5)

This invention relates to the preparation of polyurethanes. More particularly, the invention relates to the catalytic production of polyurethane resins and plastics from polyfunctional isocyanotes or isothiocyanates and organic compounds containing terminal hydroxyl groups. Specifically, the invention provides a process for the preparation of polyurethane resins and plastics which comprises reacting an organic polyisocyanate and/or polyisothiocyanate with an organic compound containing terminal hydroxyl groups in the presence of a heat-sensitive acid addition salt of a tertiary aminophenol and heating.

The reaction that occurs during the production of a urethane by reacting an organic isocyanate or isothiocyanate with an organic compound containing terminal hydroxyl groups is theoretically applicable to a large number of such organic hydroxyl compounds. However, the properties of the resultant urethanes and their ease of production depend to a large extent on the particular organic compound containing terminal hydroxyl groups used; as, for example, a primary alcohol having up to 6 carbon atoms will react exothermically and without difficulty with an aryl isocyanate, whereas the reaction of a secondary or tertiary alcohol or primary alcohol having more than 6 carbon atoms usually has to be performed in the presence of a catalyst to initiate or control the reaction. The catalysts that have been suggested for the said reaction, among others, are the nitrogen bases as, for example, the tertiary alkylamines such as trihexylamine, tributylamine, or tripropylamine; tertiary alkylamino alcohols having a free hydroxyl group or a carbon atom beta to the nitrogen atom as, for example, dibutylaminoethanol or butyldiethanolamine; pyridine; or N-alkyl morpholines, such as N-methyl morpholine or N-octyl morpholine., In general, these catalysts do not sufficiently accelerate the reaction for some uses. While the use of catalytic amounts of tertiary aminophenols sufficiently accelerate the urethane reaction and overcome many of these shortcomings, there is still a need to more effectively control the accelerating effect of such catalysts, particularly when the polyurethane is to be used for textile coating.

It has now been discovered that the use of a heat-sensitive tertiary aminophenol acid addition salt in the production of polyurethane resins and plastics from polyisocyanates and organic compounds containing termnial hydroxyl groups enables the reaction to be controlled according to the amount of heat applied to decompose said acid addition salt to produce the free tertiary aminophenol.

It is therefore an object of the present invention to provide an improved process for preparing polyurethane resins and plastics. It is another object to provide a catalyzed process for preparing polyurethane resins and plastics wherein a shorter reaction time is obtained. It is a further object to provide a process for preparing polyurethane resins and plastics wherein the reaction can be conveniently controlled. It is still a further object to provide a process for preparing polyurethane resins and plastics which are particularly suitable as textile coatings.

These and other objects of the invention will be apparent from the following detailed description thereof.

It has been discovered that these and other objects may be accomplished by the process which comprises reacting an organic polyfunctional isocyanate and/or isothiocyanate with an organic compound containing terminal hydroxyl groups in the presence of a heat-sensitive acid addition salt of a tertiary aminophenol and heating.

It has been found that the use of these heat-sensitive acid addition salts of tertiary aminophenols in the production of polyurethane resins and plastics not only provide the advantages of the tertiary aminophenol catalysts but also provide the unexpected and useful advantage of reaction control. In other words, the use of these catalysts allow the urethane reaction to be effectively controlled according to the amount of heat supplied.

In this specification, a polyurethane resin is a compound produced by reacting an organic polyisocyanate or polyisothiocyanate with an organic compound containing terminal hydroxyl groups, and a polyurethane plastic is a compound produced by reacting a polyurethane resin containing free isocyanato or isothiocyanato groups with a compound containing active hydrogen atoms, or by reacting or organic polyisocyanate or polyisothiocyanate with an organic compound containing terminal hydroxyl groups in the presence of a compound containing active hydrogen atoms. As used herein, the expression "active hydrogen atom" means a hydrogen atom characterized by the Zerewitinoff method; see for example 49 J.A.C.S., 3181 (1929).

The acid addition salt acts as an inhibited catalyst and is hereinafter referred to as a heat-sensitive acid addition salt of a tertiary aminophenol. In this specification "heat-sensitive" means that the catalyst compound is decomposable to form the free tertiary aminophenol upon the application of heat, say, within the temperature range of from about 40° C. to about 300° C. with temperatures in the range of from about 65° C. to about 150° C. being usually preferred.

Heat-sensitive acid addition salts of tertiary aminophenols can be produced by processes hitherto known or described in the chemical literature. They can be produced from any acid and tertiary aminophenol that form an acid addition salt that decomposes on being heated in a reaction mixture for the production of a urethane or a polyurethane resin or plastic to form the free tertiary aminophenol; for exmaple, 2-ethyl hexoic acid and tris(2,4,6-dimethylaminomethyl)phenol form an acid addition salt that will decompose on being heated in a reaction mixture for the production of a urethane or a polyurethane resin or plastic to form the free tris(2,4,6-dimethylaminomethyl)phenol.

Tertiary aminophenols suitable for preparing the heat-sensitive catalysts for use in the present invention can be produced by processes hitherto known or described in the chemical literature; for example, tris(2,4,6-dimethylaminomethyl)phenol can be produced from phenol, formaldehyde, and dimethylamine by the Mannich reaction (see vol. I, p. 495, and vol III, pp. 823 and 824, of Chemistry of Carbon Compounds, edited by E. H. Rodd and published by Elsevier Publishing Company in 1956).

The heat-sensitive acid addition salt of a tertiary aminophenol can be derived from a tertiary aminophenol containing one or more tertiary amino groups and one or more phenolic hydroxyl groups. A tertiary amino group contained by the tertiary aminophenol may be any tertiary amino group; for example, it can be the group:

wherein $R_1$ and $R_2$ are alike or unlike, and are each an aliphatic, cycloaliphatic, aryl, heterocyclic, aliphatic-cycloaliphatic, aliphatic-aryl, aliphatic-heterocyclic, cycloaliphatic-aliphatic, cycloaliphatic-aryl, cycloaliphatic-heterocyclic, aryl aliphatic, aryl cycloaliphatic, aryl heterocyclic, heterocyclic aliphatic, heterocyclic-cycloaliphatic or heterocyclic aryl group; or $R_1$ and $R_2$ are joined to form an alkylene chain that can be interrupted by a heterocyclic atom. Preferred tertiary amino groups are obtained when $R_1$ and $R_2$ are each an alkyl, cycloalkyl, phenol, naphthyl, piperid-4-yl, alkyl cycloalkyl, alkyl phenyl, alkyl naphthyl, 1-alkyl-4-piperidyl, cycloalkyl alkyl, cycloalkyl phenyl, cycloalkyl naphthyl, 1-cycloalkyl-3-pyrrolidinyl, phenyl alkyl, naphthyl alkyl, phenyl cycloalkyl, 1-phenyl-4-piperidyl, pyrid-4-yl alkyl, pyrrolidin-3-yl cyclohexyl, morpholin-3-yl phenyl, morpholino, pyrrolidino or piperidino group. Particularly preferred tertiary amino groups are obtained when $R_1$ and $R_2$ are each an alkyl group containing 1 to 8 carbon atoms. If desired, the tertiary amino groups can be joined to the phenolic residue by an alkylene group, preferably an alkylene group containing 1 to 8 carbon atoms.

Some examples of tertiary aminophenols containing one or more tertiary amino groups and one or more phenolic hydroxyl groups are: 1-hydroxy-2-dialkylamino-4,5-dialkylbenzenes such as 1-hydroxy-2-diethylamino-4,5-dimethylbenzene; 1-hydroxy-2-dialkylamino naphthalenes such as 1-hydroxy-2-dimethylamino naphthalene; 1-hydroxy-2,4-bis(dialkyamino)benzenes such as 1-hydroxy - 2,4-bis(diethylamino)benzene; 1-hydroxy-2-dialkylaminoalkyl benzenes such as 1-hydroxy-2-dimethylaminoethyl benzene; 1,2-dihydroxy-3-dialkylaminoalkyl benzenes such as 1,2-dihydroxy-3-dimethylaminomethyl benzene; and 1,2,3-trihydroxy-5-dialkylaminoalkyl benzenes such as 1,2,3-trihydroxy-5-dimethylaminomethyl benzene.

Preferred heat-sensitive addition salts of tertiary aminophenols are derived from tertiary aminophenols of the general formula:

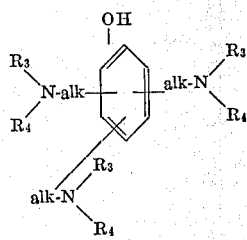

wherein alk is an alkylene group; and $R_3$ and $R_4$ are similar or dissimilar and are each an alkyl group. Particularly preferred heat-sensitive acid addition salts of tertiary aminophenols are those derived from 2,4,6-tris(dialkylaminoalkyl)phenols, especially those wherein the alkyl groups have 1 to 8 carbon atoms; as, for example, 2,4,6 - tris(dimethylaminomethyl)phenol, 2,4,6-tris - (diethylaminomethyl)phenol, and 2,4,6 - tris(N-methyl-N-ethylaminoethyl)phenol.

The heat-sensitive acid addition salt can be derived from an inorganic acid or an organic carboxylic acid. The organic acid can contain one or more carboxyl groups; for example, acetic acid, butyric acid, caproic acid, caprylic acid, 2-ethyl hexoic acid, pelargonic acid, succinic acid, adipic acid, suberic acid or sebacic acid. Preferably, the carboxylic acid is a saturated monocarboxylic acid; for example a saturated monocarboxylic acid produced by reacting a monoolefin with carbon monoxide according to British Patents 743,957 and 798,065.

A preferred saturated monocarboxylic acid is a compound of the general formula:

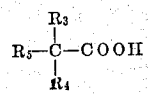

wherein $R_3$ and $R_4$ are alike or unlike, and are each an alkyl, cycloalkyl, aryl or aralkyl group; $R_5$ is a hydrogen atom or an alkyl, cycloalkyl, aryl or aralkyl group; or $R_3$, $R_4$ and $R_5$, or any two of these symbols, are joined together to form a ring. Particularly preferred saturated monocarboxylic acids contain 6 to 20 carbon atoms.

The heat-sensitive acid addition salt of the tertiary aminophenol is used in a catalytic amount and preferably between 0.1 to 2.0% by weight based on the weight of the compound containing active hydrogen atoms.

An example of the use of a heat-sensitive acid addition salt of a tertiary aminophenol is a process for the production of a urethane, which comprises reacting an organic isocyanate or isothiocyanate with an organic compound containing terminal hydroxyl groups in the presence of a heat-sensitive acid addition salt of a tertiary aminophenol and heating.

Another example of the use of a heat-sensitive acid addition salt of a tertiary aminophenol is a process for the production of a polyurethane resin, which comprises reacting an organic polyisocyanate or polyisothiocyanate with an organic compound containing terminal hydroxyl groups in the presence of a heat-sensitive acid addition salt of a tertiary aminophenol and heating.

The organic polyisocyanate or polyisothiocyanate may be represented by the general formula:

$$R(NCX)_{n+1}$$

where R represents a polyvalent organic radical, X represents an oxygen or sulfur atom and $n$ is any integer.

The reactant $R(NCX)_{n+1}$ may be aliphatic, cycloaliphatic or aromatic or any derivative thereof provided any such derivative contains no substitutent which interferes with the reaction. If desired, the organic polyisocyanate or polyisothiocyanate may be used in the form of a functional derivative containing "masked" or "blocked" isocyanate or isothiocyanate groups, free isocyanato or isothiocyanato groups being formed from "masked" or "blocked" groups by the action of heat. Examples of such functional derivatives include dissociable polymers, as, for example, dimers; dissociable addition products of organic polyisocyanates or polyisothiocyanates with phenol; and non-dissociable addition polyisothiocyanates with suitable aliphatic polyhydroxy compounds, as, for example, dimethyl propane, trimethyl propane or glycerol. It should be noted that in the non-dissociable addition products, certain free isocyanato or isothiocyanato groups are present; but they are sterically hindered to such a degree that they are substantially unreactive at ordinary room temperatures, though they can react at a useful rate if heat is applied. The dissociable polymers and dissociable and nondissociable addition products can be useful in reducing toxic risks.

Advantageously, a difunctional organic isothiocyanate or isocyanate is used. Examples of isocyanates and isothiocyanates are polymethylene diisocyanates and diisothiocyanates such as ethylene diisocyanate, trimethylene diisocyanate, tetramethylene diisocyanate, and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate, alkylidene diisocyanate and diisothiocyanates, such as ethylidene diisocyanate, butylidene diisothiocyanates, such as ethylidene diisothiocyanate; cycloalkylene diisocyanates and diisothiocyanates, such as cyclopentylene-1,3-diisocyanate, cyclohexylene-1,3-diisocyanate and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanate, 1-methyl-2,4-phenylene diisocyanate, naphthylene - 1,4 - diisocyanate, diphenylene - 4,4' - diisocyanate or p-phenylene diisothiocyanate; aliphatic-aromatic diisocyanates or diisothiocyanates, such as xylene-1,4-diisocyanate, xylylene-1,3-diisocyanate, 4,4'-diphenylene-methane diisocyanate, 4,4'-diphenylene-propane diisocyanate, xylylene-1,4-diisothiocyanate or durene diisocyanate. In fact, any polyisocyanate or polyisothiocyanate of the general formula $R(NCX)_{n+1}$, in which $n$ is any integer, X is oxygen or sulfur, and R is a polyvalent organic radical may be employed, though aromatic diisocyanates, for example, a toluene diisocyanate or isomeric mixture thereof, are preferred.

The organic compound containing terminal hydroxyl groups may be a polyoxyalkylene polyol, as, for example, a polyoxyalkylene polyol produced from one or more alkylene oxides (the term "alkylene oxide" means any organic compound containing an epoxy group) as for example epichlorhydrin, ethylene oxide, 1,2 - dimethylethylene oxide, propylene oxide, 1,2-butylene oxide, styrene oxide or cyclohexane oxide and an alkylene polyol such as for example ethylene glycol glycerol 126-hexanetriol or pentaerythritol; or an alkylene oxide polymer or copolymer (for example a block or random copolymer). A useful polyoxyalkylene polyol is an alkylene oxide/alkylene polyol adduct that has been reacted with an alkylene oxide as, for example, described in copending United States application, Serial No. 142,011, filed October 2, 1961; for example, a propylene oxide/glycerol adduct that has been reacted with less than 10% by weight of ethylene oxide, preferably 3 to 8% by weight of ethylene oxide. The polyoxyalkylene polyols are preferably produced according to the processes disclosed in British Patents Nos. 785,229; 785,053; 793,065; and 799,955, among others. Suitable polyoxyalkylene polyols have an average molecular weight between 300 to 6,000; for example, about 500 to about 3,000. A rigid or semi-rigid polyurethane plastic may be produced from a polyurethane resin of the invention if a polyoxyalkylene polyol having a molecular weight of 500 or less is used.

The organic compound containing terminal hydroxyl groups may also be a polyoxyalkylene polyol produced from an alkylene oxide and an adduct formed from a primary or secondary amine and a polyepoxide resin; for example, a hydroxyl compound obtained by reacting an alkylene oxide with an adduct formed from a dialkanolamine and a polyepoxide resin formed from an epihalohydrin and a polyhydric organic compound. Such an organic compound containing terminal hydroxyl groups may be produced from propylene oxide and an adduct formed from diethanolamine and a polyepoxide resin formed from epichlorhydrin and 2,2-bis(4-hydroxyphenyl)propane. Suitable polyepoxide/amine adducts and their preparation are illustrated in copending United States application, Serial No. 839,294, filed September 11, 1959. If desired, the adduct of the primary or secondary amine and a polyepoxide resin may be used as the compound containing terminal hydroxyl groups.

The organic compound containing terminal hydroxyl groups may further be a conventional polyester containing terminal hydroxyl groups ordinarily used in the production of polyurethane elastomers. For the purposes of the invention, there is included among the polyesters as equivalents thereof polyether-esters (for example, polydiethylene glycol adipate) and polyester amides (for example, polyethylene glycol hexamethylene diamine adipate-adipamide). Examples of the polyesters are compounds obtained by reacting a polyhydric alcohol (for example, ethylene glycol and/or glycerol) with a polycarboxylic acid (for example, polyethylene adipate, polyethylene sebacate, poly - 1,2 - propylene adipate, poly ethylene and poly-1,2-propylene succinate, or an alkyd resin such as glyceryl phthalate). Suitable polyesters preferably have an average molecular weight between 300 and 6,000; and more preferably from about 500 to about 3,000.

A rigid cellular polyurethane plastic can be produced as hereinafter described if a polyester having an average molecular weight of 500 or less is used. A semi-rigid cellular polyurethane plastic can be produced as hereinafter described from a polyester having an average molecular weight of 5,000.

If desired, the polyurethane resin can be produced under substantially anhydrous conditions; that is, the water content of the reaction mixture is not more than 0.1% by weight based on the weight of the reaction mixture. The ratio of total isocyanato or isothiocyanato groups to total hydroxyl groups present in the reaction mixture can also be substantially equal to or greater than 1:1; for example, 2:1 or greater. When the polyurethane resin is intended for the production of a cellular polyurethane plastic, said ratio can be such that the resultant polyurethane resin contains free isocyanato or isothiocyanato groups that are capable of reacting with a compound containing active hydrogen atoms; or said ratio can be such that the resultant polyurethane resin contains free hydroxyl groups that are capable of reacting with an organic polyisocyanate or polyisothiocyanate to produce a polyurethane resin containing either free isocyanato or isothiocyanato groups.

In the production of a polyurethane resin, the starting materials can be mixed together in the required proportions; and the reaction can be allowed to proceed either to a desired viscosity of the reaction mixture or to a desired isocyanate or isothiocyanate content thereof. If desired, the reaction can be performed under an inert atmosphere and, if desired, under reduced pressure. The organic polyisocyanate or polyisothiocyanate can also be added stepwise to the organic compound containing terminal hydroxyl groups and a tertiary aminophenol so as to promote the formation of long chains in the polyurethane resin; for example, a half or less of the total amount of the organic polyisocyanate or polyisothiocyanate can be added to a mixture of the organic compound containing terminal hydroxyl groups and a tertiary aminophenol, and the remainder of the organic polyisocyanate or polyisothiocyanate added when the mixture has reached a suitable viscosity. If a polyurethane resin containing free isocyanato or isothiocyanato groups is desired, the necessary amount of organic polyisocyanate or polyisothiocyanate can be reacted stepwise as hereinbefore described. It should be noted that a different organic compound containing terminal hydroxyl groups can be added during the second stage of the stepwise addition.

When a molecular excess of organic polyisocyanate or polyisothiocyanate over the organic compound containing terminal hydroxyl groups is used, a polyurethane resin having a terminal isocyanato or isothiocyanato groups is formed. The amount or organic polyisocyanate or polyisothiocyanate used is a major factor that determines the chain length of the polyurethane resin. Thus, when the amount of the organic polyisocyanate or polyisothiocyanate is only slightly more than one mole per mole of organic compound containing terminal hydroxyl groups, there will be a greater length in the polyurethane resin; and when the amount of the organic polyisocyanate or polyisothiocyanate is greater than 3 moles per mole of organic compound containing terminal hydroxyl groups, the chain length in the polyurethane resin will be shorter. The physical characteristics of the polyurethane resins, and polyurethane plastics obtained therefrom are, inter alia, determined by the molecular weights, structures, and proportions of the reactants. The amount of the organic polyisocyanate or polyisothiocyanate used may be varied according to whether the polyurethane resin to be produced is to be pressed in a heated mold to give a rubber-like product, or cast into sheet form.

The polyurethane resin can be used in lacquers, varnishes, or paints; converted into a synthetic rubber by heating it in the presence of a basic catalyst and, if desired, a surface-active agent; or if containing free isocyanato or isothioyanato groups, converted into a polyurethane plastic by reacting it with a compound containing active hydrogen atoms in the optional presence of a surface-active agent as, for example, a silicone oil.

The polyurethane resins (prepolymers) of the present invention may be converted into plastics by reacting with compounds containing active hydrogen atoms. Such compounds containing active hydrogen atoms are preferably difunctional or trifunctional compounds, which preferably have relatively low melting points, for example, below 150° C., for ease of mixing. Suitable difunctional compounds include water; glycols such as ethylene glycol, 1,3-propane diol, 1,4-butane diol and 1,4-butene diol; primary or secondary amines, such as, for example, ethylene diamine, trimethylene diamine, tetramethylene diamine, m-phenylene diamine, naphthalene diamines, toluene-2,4-diamine, aminobenzylaniline and aminodiphenylamine; dicarboxylic acids, such as succinic acid, hydroxyamines, such as 2-amino-ethyl alcohol, 2-amino-1-hydroxy-naphthalene and m-aminophenol; hydroxycarboxylic acids, such as glycolic acid and alpha-hydroxypropionic acid; and amino-carboxylic acids such as amino-acetic acid and amino-benzoic acid. A suitable trifunctional compound is glycerol.

If desired, a polyurethane plastic can be produced by reacting a polyurethane resin containing free isocyanato or isothiocyanato groups (which has been produced by reacting an organic compound containing terminal hydroxyl groups in the absence of a catalyst) with a compound containing active hydrogen atoms in the presence of a heat-sensitive acid addition salt of a tertiary aminophenol.

Furthermore, a polyurethane plastic can be produced in a one-stage process by reacting an organic polyisocyanate or polyisothiocyanate with an organic compound containing terminal hydroxyl groups in the presence of a compound containing active hydrogen atoms and a heat-sensitive acid addition salt of a tertiary aminophenol. In this one-stage process, the ratio of total isocyanate or isothiocyanate groups present in the reaction mixture can be substantially equal to or greater than 1:1.

The process can also be performed in the presence of an organic tin catalyst, such as, for example, dibutyl tin dilaurate, stannous 2-ethyl hexoate or a tin salt of a synthetic acid as described in copending United States application Serial No. 188,986, filed April 20, 1962, now abandoned, and/or a surface-active agent, such as a silicone oil.

Additives, particularly light stabilizers and/or anti-oxidants and also, is desired, fillers and/or pigments of various kinds can be incorporated in the mixture of the reactants used for preparing foamed polyurethane plastics in accordance with the present invention.

If desired, the polyurethane resin may be prepared in the presence of an organic solvent such as benzene, toluene, xylene, solvent naphtha, gasoline, carbon tetrachloride, ethyl acetate, or amyl acetate. A film of the resulting solution may then be exposed to atmospheric moisture or reacted with an organic compound containing active hydrogen, to form a substantially bubble-free polyurethane plastic sheet.

The amount of organic tin catalyst added can be between 0.01 to 10% by weight based on the weight of the organic hydroxyl compound; and the weight of the surface-active agent added can be between 0.1 to 3.0% by weight based on the weight of the organic compound containing terminal hydroxyl groups.

The above-described processes for the production of a polyurethane plastic can be performed under such conditions that carbon dioxide or carbon oxysulfide is evolved to produce a cellular structure in the resultant polyurethane plastic. If desired, the blowing action by the carbon dioxide or carbon oxysulfide evolved can be supplemented by the use of a volatile hydrocarbon; for example, a fluorochlorohydrocarbon like trichlorofluoromethane.

If a liquid volatile halohydrocarbon is added to a reaction mixture for the production of a polyurethane plastic, heat evolved and/or applied during the formation of the polyurethane plastic is sufficient to vaporize the halohydrocarbon. The blowing can also be assisted or effected by mechanical admixture of an inert gas.

Advantages of the invention are illustrated in the following examples. The reactants, and their proportion, and other specific ingredients of the recipes are presented as being typical and various modifications can be made in view of the foregoing disclosure and discussion, without departing from the spirit or scope of the disclosure or of the claim. Unless otherwise specified, parts and percentages disclosed in the examples are by weight. The term "p.b.w." means parts by weight.

EXAMPLE I

This example illustrates the advantages of using heat-sensitive acid addition salt of a tertiary aminophenol as a catalyst in preparing polyurethane resins.

0.25 p.b.w. of stannous 2-ethyl hexoate was dispersed at ambient temperature in 100 p.b.w. of a polyoxyalkylene polyol having an average molecular weight of 3000 formed from propylene oxide and glycerol; and 19 p.b.w. of a 4:1 mixture of toluene-2,4-diisocyanate and toluene-2,6-diisocyanate were added thereto. The resultant mixture was mixed for 25 minutes; and, at the end of the mixing period, 9.5 p.b.w. of the 4:1 mixture of toluene 2,4-diisocyanate and toluene-2,6-diisocyanate were added thereto. After six days from the addition of the diisocyanate mixture to the polyoxyalkylene polyol, the reaction mixture comprised a polyurethane resin containing free isocyanato groups and having a viscosity of 110 poises at ambient temperature. For convenience, this resin will be referred to hereinafter as polyurethane resin A.

One hundred p.b.w. of polyurethane resin A were mixed with 1% by weight of the tri-2-ethyl hexoate of tris(2,4,6-dimethylaminomethyl)phenol; and a composition having a pot-life of about two weeks was obtained. This composition, after spreading on a textile and heating the coated textile in air at 100° C. for five minutes, gave a coated textile that was too sticky to roll. On adding 2% instead of 1% by weight of the tri-2-ethyl hexoate of tris(2,4,6-dimethylaminomethyl)phenol to a 100 p.b.w. of the polyurethane resin A, a composition having a pot life of about two weeks was obtained. This composition, after spreading on a textile and heating the coated textile in air at 100° C. for five minutes, gave a coated textile that was dry and unsticky. On, however, adding 1.5% by weight of the tri-2-ethyl hexoate of tris(2,4,6-dimethylaminomethyl)phenol to a 100 p.b.w. of polyurethane resin A, a composition having a pot life of about two weeks was obtained; but this composition, after spreading on a textile and heating the coated textile in air at 100° C. for five minutes, gave a textile having a tacky coating that was still tacky after two hours from rolling the coated textile.

*Comparison*

When a 100 p.b.w. of polyurethane resin A, after mixing with 0.8% by weight of glycerol to react with the free isocyanato groups present in the prepolymer, was mixed with 1% by weight of tris(2,4,6-dimethylaminomethyl)phenol, a composition having a pot life of less than 45 minutes was obtained. A sample of the resultant composition, after spreading on a textile, heating the coated textile in air at 100° C. for 5 minutes and rolling the coated textile, gave a coated textile that was completely dry after two hours.

This comparison using no heat-sensitive acid addition salt of tris(2,4,6-dimethylaminomethyl)phenol indicated that the reaction between free isocyanate groups of the polyurethane resin A and active hydrogen atoms of glycerol and atmospheric moisture was inhibited until the 2-ethyl hexoate salt of tris(2,4,6-dimethylaminomethyl)phenol had been decomposed by the action of heat to form free tris(2,4,6-dimethylaminomethyl)phenol.

Furthermore, it was found that if the free tertiary aminophenol instead of the heat-sensitive acid addition salt was initially used in the coating of textiles as just described, undesirable reactions occurred between the polyurethane resin A and atmospheric moisture while the textile was being coated.

EXAMPLE II

Example I is substantially repeated except that an equivalent amount of bis(4-isocyanatophenyl)methane was used in lieu of the tolylene diisocyanate. Related results are obtained.

EXAMPLE III

Example I is essentially repeated except that the heat-sensitive addition salt is prepared by reacting tris(2,4,6-dimethylaminomethyl)phenol with an alpha-substituted monocarboxylic acid having from 9–11 carbon atoms and prepared by reacting a mixture of monoolefins having from 8–10 carbon atoms with carbon monoxide and water using $BF_3$ catalyst. Similar results are obtained.

EXAMPLE IV

The process of Example I is repeated wherein the polyoxyalkylene polyol is replaced with a glycidyl polyether of 2,2-bis(4-hydroxyphenyl)propane obtained by reacting epichlorohydrin and 2,2 - bis(4 - hydroxyphenyl)propane and having a molecular weight of about 350 and an epoxy value of abolt 0.5 eq./100 g. Related results are obtained.

EXAMPLE V

Related results are obtained when an equivalent amount of a polydiethylene glycol adipate having an average molecular weight of 3000 is used in lieu of the polyoxyalkylene polyol derived from propylene oxide and glycerine.

I claim as my invention:

1. A process for the production of a polyurethane resin which comprises reacting an organic polyfunctional compound selected from the group consisting of diisocyanates and diisothiocyanates with an organic compound containing terminal hydroxyl groups selected from the group consisting of polyesters and polyethers having an average molecular weight between 300 and 6000 in the presence of a heat-sensitive acid addition salt of 2,4,6-tris-(dialkylaminoalkyl)phenols and heating to a temperature in the range of from 40° C. to 300° C., and wherein heat-sensitive is deemed to mean that said salt is decomposable to form the free tertiary aminophenol upon the application of said heat.

2. A process as in claim 1 wherein the organic compound containing terminal hydroxyl groups is a polyether formed from an epihalohydrin and a polyhydric organic compound selected from the group consisting of polyhydric phenols and alcohols.

3. A process as in claim 2 wherein the polyether is formed from epichlorohydrin and 2,2 - bis(4 - hydroxyphenyl)propane.

4. A process as in claim 1 wherein the organic polyfunctional compound is an aromatic diisocyanate.

5. A process as in claim 4 wherein the aromatic diisocyanate is a tolylene diisocyanate.

6. A process as in claim 1 wherein the polyether is a polyoxyalkylene polyol having an average molecular weight between 500 and 3000.

7. A process as in claim 6 wherein the polyoxyalkylene polyol is produced from propylene oxide and glycerol.

8. A process for the production of a polyurethane resin which comprises reacting an organic polyfunctional compound selected from the group consisting of diisocyanates and diisothiocyanates with an organic compound containing terminal hydroxyl groups and selected from the group consisting of polyesters and polyethers having an average molecular weight between 300 and 6000 in the presence of the 2-ethyl hexoate salt of tris(2,4,6-dimethyl-aminomethyl)phenol, and heating to a temperature between 40° C. and 300° C.

9. A process for preparing a polyurethane plastic which comprises reacting (1) an organic polyfunctional compound selected from the group consisting of diisocyanates and diisothiocyanates, (2) a compound containing a plurality of active hydrogen atoms as determined by the Zerewitinoff method selected from the group consisting of glycols, primary and secondary amines, dicarboxylic acids, hydroxyamines, hydroxycarboxylic acids, aminocarboxylic acids and glycerol, and (3) an organic compound containing terminal hydroxyl groups selected from the group consisting of polyesters and polyethers having an average molecular weight between 300 and 6000 in the presence of a heat-sensitive acid addition salt of 2,4,6-tris(dialkylaminoalkyl)phenols, in such amounts that the ratio of total isocyanato and isothiocyanato groups to total hydroxyl groups is greater than 1:1 and heating to a temperature between 40° C. and 300° C., and wherein heat-sensitive is deemed to mean that said salt is decomposable to form the free tertiary aminophenol upon the application of said heat.

10. A process as in claim 9 wherein the process is carried out in the presence of a volatile fluorochlorohydrocarbon blowing agent.

References Cited by the Examiner

UNITED STATES PATENTS

| | | | |
|---|---|---|---|
| 2,929,800 | 3/1960 | Hill | 260—75 |
| 3,025,160 | 3/1962 | Bunge et al. | 260—77.5 |
| 3,050,475 | 8/1962 | Muller et al. | 260—77.5 |
| 3,072,582 | 1/1963 | Frost | 260—77.5 |

LEON J. BERCOVITZ, *Primary Examiner.*